United States Patent Office.

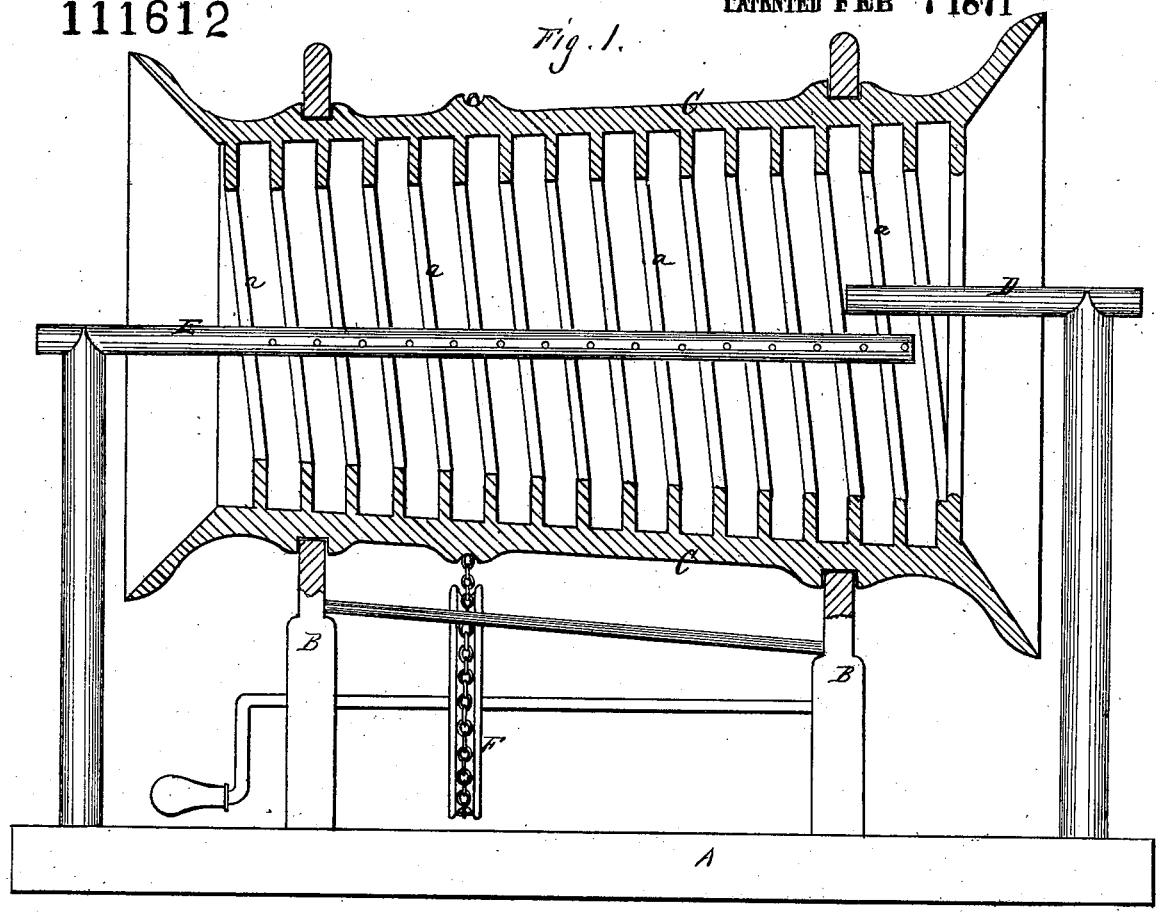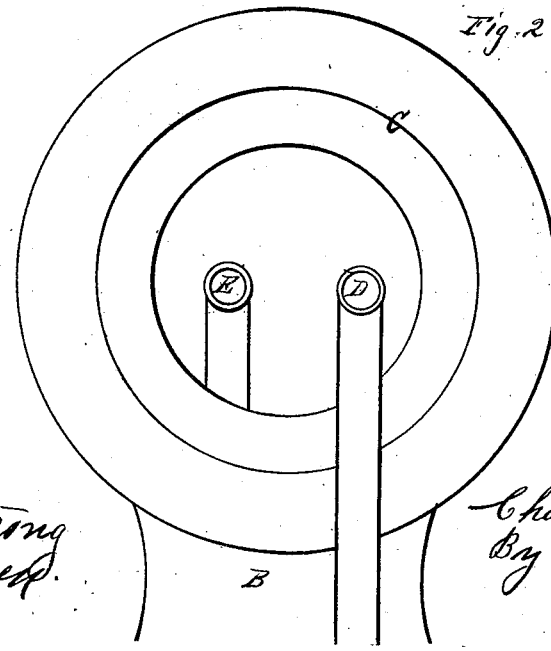

CHARLES C. COLEMAN, OF SAN FRANCISCO, CALIFORNIA.

Letters Patent No. 111,612, dated February 7, 1871.

IMPROVEMENT IN APPARATUS FOR CLEANING SULPHURETS AND OTHER ORES.

The Schedule referred to in these Letters Patent and making part of the same.

*To all whom it may concern.*

Be it known that I, CHARLES C. COLEMAN, of the city and county of San Francisco, State of California, have invented a Sulphuret-Saving Machine; and I do hereby declare the following description and accompanying drawing are sufficient to enable any person skilled in the art or science to which it most nearly appertains to make and use my said invention or improvement without further invention or experiment.

My invention relates to an improved apparatus for saving sulphurets and separating them from the lighter sand and debris which escapes from the mills or from sluices in ordinary placer or hydraulic mining; and It consists of a large hollow revolving vessel, which may be cylindrical in shape; or it may be slightly tapered, so as to be somewhat smaller at one end than the other.

This cylinder or cone lies upon its side, revolving on a horizontal axis, and has its interior made in the form of a screw the threads of which are of considerable depth. The sand and water are carried into the cylinder and deposited near its lower end.

Another pipe extends entirely through the cylinder, and is perforated so as to discharge clear water against the sides of the cylinder, and this washes the sulphurets clean, and also keeps them at the bottom of the screw, so that as the machine turns they advance along the bottom till they reach the upper end of the machine, where they are discharged clean, while the lighter debris is washed out at the lower end.

Referring to the accompanying drawing for a more complete explanation of my invention—

A is a frame, upon which, in the present case, the supporting-standards B B are fastened.

The vessel C is either cylindrical or it may form a hollow frustum of a cone, in which case the necessary inclination will be given to the bottom without inclining the axis about which it revolves. This cylinder is supported upon the standards B, so that it turns in the inclosing-rings, thus doing away with the necessity of an axis, and so leaving the interior entirely unobstructed.

Friction-rollers may be employed within the supporting-rings, so as to allow the cone to turn with the greatest ease.

The cone may be made of wood or other suitable material, and the interior is formed into screw-threads. *a a* of considerable depth.

A pipe, D, discharges the sand or tailings in the usual form into the cone, near its lower end, where they fall between some of the threads *a* of the screw described. The cone is then kept slowly revolving in such a direction that the sulphurets and particles of gold remaining at the bottom and between the threads of the screw will advance toward the upper end of the machine, and finally be delivered at that point, falling into any receptacle placed for them.

In order to prevent the sulphurets from clinging to the cone and being carried up the side, a pipe, E, passes through the cone, and is pierced with holes on one side, so that a jet of water is constantly thrown against the side, between the threads, and this washes everything down and keeps it at the bottom between the threads, while its flow carries off all lighter and useless particles to be discharged at the lower end.

The cone may be driven by a chain or other belt, from a pulley, F, or by any of the ordinary appliances used in such cases, and the whole machine forms an economical and cheaply-constructed device for the purpose described.

Having thus described my invention,

What I claim, and desire to secure by Letters Patent, is—

1. A machine, having the cone or cylinder C, with the interior constructed as shown, and operating to separate gold and sulphurets, substantially as herein described.

2. The perforated jet-tube E, or an equivalent device for washing the sulphurets and retaining them always at the bottom of the cone, substantially as and for the purpose described.

In witness that the above-described invention is claimed by me I have hereunto set my hand and seal.

CHARLES C. COLEMAN. [L. S.]

Witnesses:
    GEO. H. STRONG,
    J. L. BOONE.